UNITED STATES PATENT OFFICE.

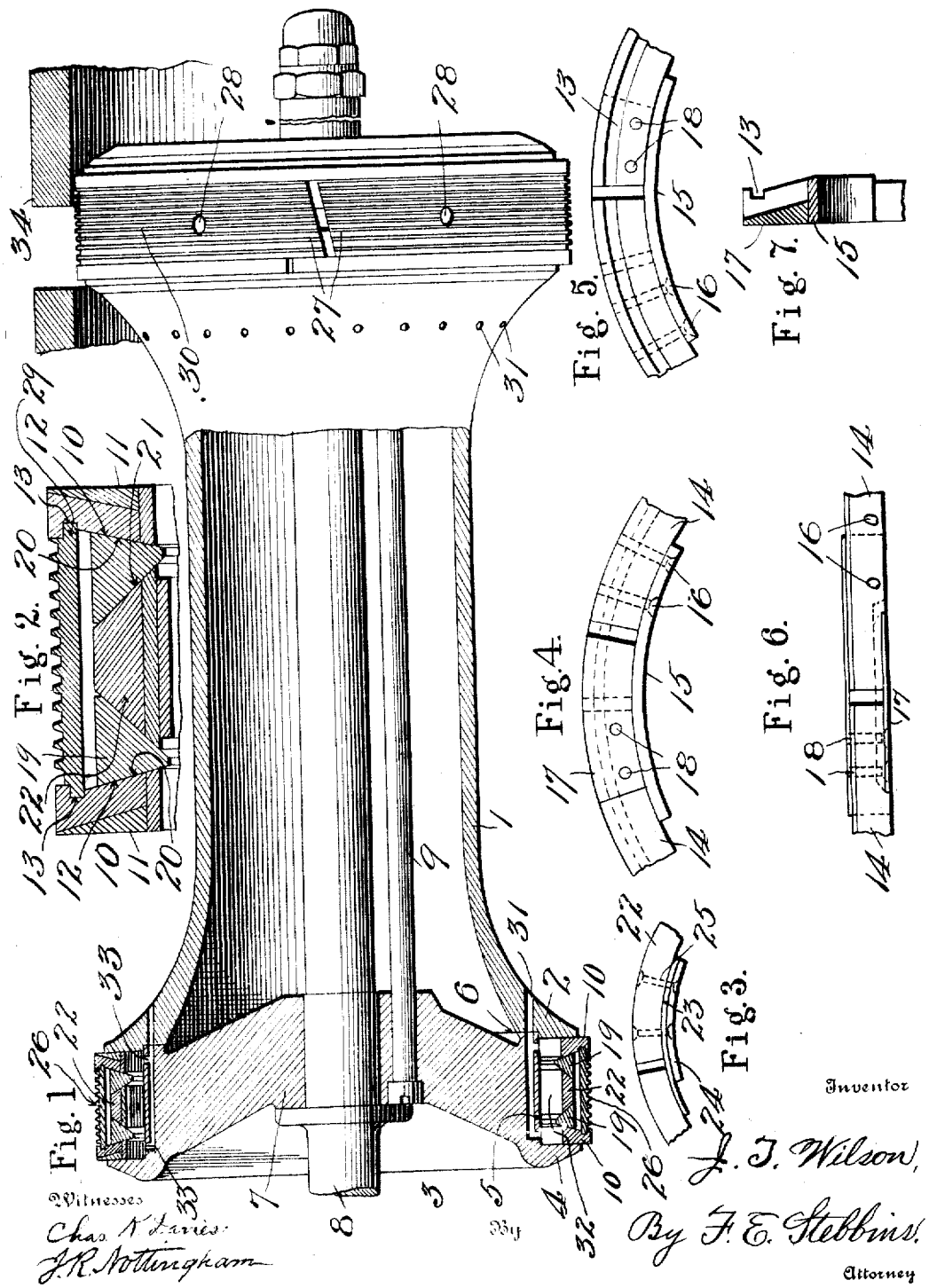

JOHN THOMAS WILSON, OF JERSEY SHORE, PENNSYLVANIA.

SEMI-PLUG PISTON-VALVE AND PISTON.

No. 904,391.  Specification of Letters Patent.  Patented Nov. 17, 1908.

Application filed March 9, 1907. Serial No. 361,453.

*To all whom it may concern:*

Be it known that I, JOHN THOMAS WILSON, a citizen of the United States, residing at Jersey Shore, in the county of Lycoming and State of Pennsylvania, have invented new and useful Improvements in Semi-Plug Piston-Valves and Pistons, of which the following is a specification.

The invention relates to piston valves and pistons, and especially to the packing for semi-plug valves, the object being the provision of a packing, first, having snap or bearing rings which shall retain their normal parallel positions when in service and not move laterally or tip sidewise and occupy positions where the edges of the rings would be liable to engage or catch into the metallic edges of the cage or lining which bound the ports; second, which may collapse when the steam is shut off and the locomotive drifting so the air compressed by the piston of the engine may pass between the cage and the packing; and, third, which shall admit of the snap rings thereof being quickly expanded under steam pressure prior to the expansion of the wedge ring of the packing.

With these main ends in view my invention consists in certain novelties of construction and combinations of parts as hereinafter set forth and claimed.

The accompanying drawing illustrates an example of the physical embodiment of the invention constructed according to the best mode I have so far devised for the practical application of the principle and to attain the desired results.

Figure 1 shows a piston valve, part thereof being in section. Fig. 2 is an enlarged view through the packing. Fig. 3 shows the wedge ring joint. Figs. 4, 5, and 6 are opposite side and top plan views of a snap ring joint. Fig. 7 is a cross section of Fig. 6 between the free ends of the ring and through the bottom and side joint plates.

Referring to the several views, the numeral 1 designates the spool of the valve; 2, the flange of the spool; 3, the follower; 4, the flange of the follower; 5, the rim of the follower; 6, the joint between the rim of the follower and the end of the spool; 7, the perforated hub of the follower; 8, the valve stem of any approved construction; 9, a retaining bolt threaded at the end not shown and engaging a threaded hole in the follower at the opposite end of the spool body; 10, the snap rings; 11, the vertical plane side of a snap ring; 12, the opposite beveled side or surface; 13, a circular groove near the outer edge of the beveled surface; 14, the free ends of the snap ring; 15, the bottom joint plate; 16, machine screws which secure one end of the joint plate to one end of the snap ring; 17, a side joint plate; 18, machine screws which secure one end of the side joint plate to the free end of the snap ring opposite to the end of the snap ring to which the bottom joint plate is secured; 19, the integral wall rings; 20, the outer beveled surface in contact with the beveled surface of a snap ring; 21, the inner beveled surface in contact with a beveled surface of a wedge ring; 22, the wedge ring; 23, the joint plate; 24, a spring plate; 25, machine screws passed through the ends of the wedge ring, joint plate, and spring plate; 26, the wide ring; 27, the free ends of the wide ring; 28, holes through the wide ring; 29, tongues at opposite edges of the wide ring which fit within the grooves 13 in the snap rings; 30, circular parallel threads about 1/32" wide at their outer surfaces in connection with the wide ring; 31, a series of small passages made in the end of the spool and follower and extended under the packing; 32, an open space beneath the packing; 33, are a series of ports from the passages 31 and located directly beneath the snap rings; and 34 is a part of the cage.

The relative locations of the several parts and elements are clearly shown by the several figures.

The mode of operation is as follows: Assuming the piston valve to be in operative position within a cylinder or cage with suitable openings or ports leading to the main piston cylinder, and steam admitted to the space between the ends of the spool, the steam will enter the small passages 31 and be delivered under great velocity through the ports 33 and in jets which will strike the under surfaces of the snap rings and expand them against the surface of the cage. The wedge ring will then be fully expanded as the pressure becomes equalized. Since the wall rings are integral and cannot expand they are forced sidewise under the pressure of the expanding wedge ring and press and hold the snap rings in their previously expanded positions against the flanges of the spool and follower and with their outer surfaces against the cage. When the piston moves, for example, towards the right and passes over a port, the wide ring holds the snap rings parallel so they cannot tip sidewise and their edges catch the edges of the metal bounding the port. Nor can the snap rings expand into the port or opening, inasmuch as both snap rings are held by the beveled surfaces of the wall rings. As the wide ring is provided with holes 28 steam enters beneath the ring when the same is in line with the port. To secure an approximately equal pressure upon the top and bottom surfaces of this wide ring at all positions of its travel the threads 30 are provided upon the outer surface of the ring, the spaces between said threads containing steam even when the edge or entire area of the ring has moved to one side of the port. In other words the wide ring is practically balanced at all positions of its travel. Moreover, it is obvious that the snap rings will at all times be held against the surface of the cylinder or cage, as the area of the packing exposed to pressure from the port is always less than the area of the under surface of the packing adjacent the rim of the follower to which steam is admitted by way of the passages 31 in the spool body. The outer surfaces of the threads upon the wide ring touch the inner surfaces of the cage and assist in preventing the snap rings from expanding into the port, and also prevent an excessive expansion and friction of the wide ring itself when at one side of a port should the tongue of the ring loosely fit the groove in the side of the snap ring. When steam is cut off and the locomotive is in motion the wedge ring contracts and this allows the snap rings also to contract so that air under compression from the port may pass between the packing and the cage. The snap rings are of course made smaller than the internal circumference of the cage and are loose in the cage when the piston valve is placed in working position within the cage so the said rings are not under tension when the engine is drifting.

From the foregoing description taken in connection with the drawing it is clear that I have produced a packing, firstly, having a wide ring which holds the snap rings from tipping sidewise and is subject to about equal pressure upon both outer and inner surfaces and hence is practically balanced, and cannot press excessively against the surface of the cage; secondly, that is collapsible so it will move freely within the cage when the locomotive is drifting; and, thirdly, that will allow of the expansion of the snap rings, or allow the snap rings to take the lead in expanding, before the wedge ring expands sufficiently to lock the snap rings. I have thus produced a semi-plug valve having greater advantages than both the common plug valve and the snap ring valve and without the disadvantages of either.

It is to be understood that the principle may be embodied in connection with a single snap ring, a wall ring, and a wedge ring, when said rings are arranged so the snap ring takes the lead of the wedge ring in expanding.

What I claim is:

1. The combination with a piston valve, of a packing composed of a wide ring, two expansible snap rings, two wall rings, and a wedge ring; the said piston valve being provided with means for introducing live steam directly beneath the snap rings and subsequently beneath the wedge ring.

2. The combination with a piston valve of a packing comprising a wedge ring, two wall rings, two snap rings, and a wide ring located between the snap rings; means being provided for introducing live steam beneath the snap rings in jets.

3. The combination with a piston valve having a packing comprising an expansible wide ring, two non-expansible wall rings; two expansible snap rings, and an expansible wedge ring; means being provided for introducing live steam to the under surfaces of the snap rings and subsequently to the under surface of the wedge ring.

4. The combination with a piston valve, of a packing comprising a wide ring, two snap rings, two wall rings, and a wedge ring; the said valve being provided with a series of passages with ports which ports are adapted to discharge steam directly to the under surfaces of the snap rings.

5. A packing for pistons having a snap ring, a wall ring, and an expansible wedge ring, in combination with a seat in the piston; and means for introducing steam beneath the rings and expanding the snap ring in advance of the complete expansion of the wedge ring.

6. The combination with a piston, of a packing comprising a plurality of expansible rings, a non-expansible ring, and means for causing one of said expansible rings to expand in advance of the expansion of the other.

In testimony whereof I affix my signature in presence of two witnesses.

JOHN THOMAS WILSON.

Witnesses:
  JOHN T. HYATT,
  L. M. BOYER.